(12) United States Patent
Fujita

(10) Patent No.: US 8,083,043 B2
(45) Date of Patent: Dec. 27, 2011

(54) CLUTCH DEVICE

(75) Inventor: Yasuhiko Fujita, Moriyama (JP)

(73) Assignee: EXEDY Corporation, Osaka (JP)

( * ) Notice: Subject to any disclaimer, the term of this patent is extended or adjusted under 35 U.S.C. 154(b) by 650 days.

(21) Appl. No.: 11/909,025

(22) PCT Filed: Mar. 14, 2006

(86) PCT No.: PCT/JP2006/305017
§ 371 (c)(1),
(2), (4) Date: Sep. 18, 2007

(87) PCT Pub. No.: WO2006/100966
PCT Pub. Date: Sep. 28, 2006

(65) Prior Publication Data
US 2009/0050437 A1    Feb. 26, 2009

(30) Foreign Application Priority Data

Mar. 18, 2005   (JP) ................. 2005-080144

(51) Int. Cl.
*F16D 25/0638*   (2006.01)
(52) U.S. Cl. ................. 192/85.29; 192/85.38
(58) Field of Classification Search ............. 192/85.27, 192/85.28, 85.29, 85.3, 85.37, 85.38, 113.35
See application file for complete search history.

(56) References Cited

U.S. PATENT DOCUMENTS

| | | | |
|---|---|---|---|
| 2,670,828 A * | 3/1954 | McFarland | 192/85.42 |
| 5,172,799 A * | 12/1992 | Iijima et al. | 192/106 F |
| 5,538,121 A * | 7/1996 | Hering | 192/70.12 |
| 5,651,288 A | 7/1997 | Meeusen | |
| 6,394,243 B1 * | 5/2002 | Sasse | 192/3.29 |
| 6,705,447 B2 * | 3/2004 | Gorman et al. | 192/85.25 |
| 7,431,138 B2 * | 10/2008 | Heinrich et al. | 192/85.39 |
| 2004/0195068 A1 * | 10/2004 | Sudau | 192/70.12 |
| 2005/0224308 A1 * | 10/2005 | Hauck et al. | 192/70.12 |

FOREIGN PATENT DOCUMENTS

| | | | |
|---|---|---|---|
| EP | 1610018 | * | 6/2005 |
| JP | 53-32264 A | | 3/1978 |
| JP | 59-108828 U | | 7/1984 |
| JP | 61-179726 U | | 11/1986 |
| JP | 63-86430 U | | 6/1988 |
| JP | 03-219121 A | | 9/1991 |
| JP | 10-511172 A | | 10/1998 |
| JP | 2004-100714 A | | 4/2004 |

* cited by examiner

*Primary Examiner* — David D Le
*Assistant Examiner* — Ryan Dodd
(74) *Attorney, Agent, or Firm* — Global IP Counselors, LLP

(57) ABSTRACT

A wet type multiple disc clutch transmits torque from an engine a transmission and a clutch engaging portion, a piston, a first oil passage, a second oil passage, and an operating oil supply unit. The clutch engaging portion includes a plurality of plate members. The first oil passage has one end on the piston side. The second oil passage has one end on the clutch engaging portion side. The operating oil supply unit switches a clutch engaged state, in which operating oil is supplied to the first oil passage from the outside and the operating oil in the second oil passage is drained to the outside, to a clutch disengaged state.

20 Claims, 1 Drawing Sheet

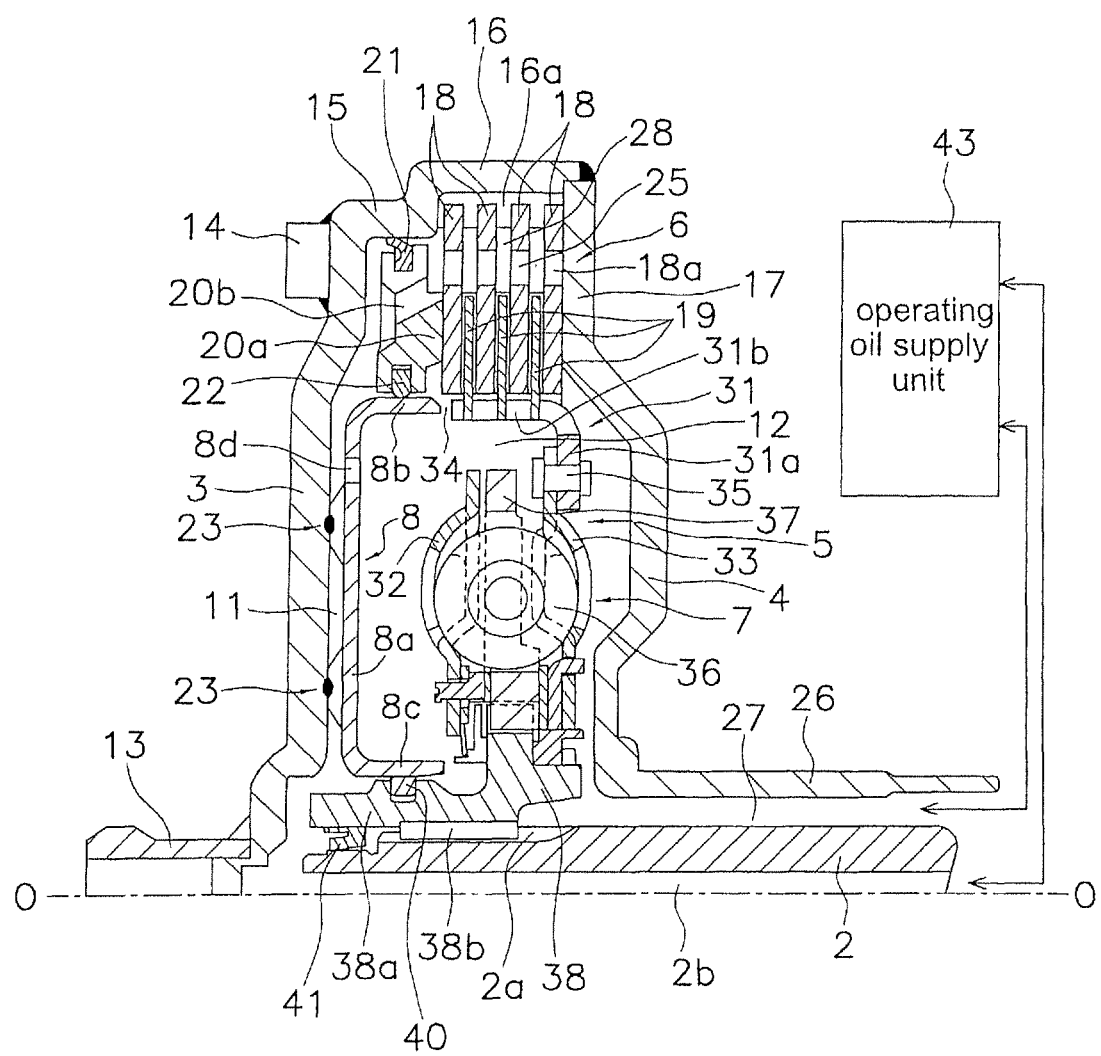

CLUTCH DEVICE

BACKGROUND OF THE INVENTION

1. Technical Field

The present invention relates to a clutch device. More specifically, the present invention relates to a clutch device driven by hydraulic pressure.

2. Background Information

A torque converter is a device for transmitting power via fluid inside of a torus having three types of runners (an impeller, a turbine, and a stator). The impeller forms a fluid chamber, in which operating oil is filled, with a front cover. The impeller mainly includes an annular impeller shell, a plurality of impeller blades fixed inside of the annular impeller shell, and an annular impeller core fixed inside of the impeller blades. The turbine is disposed in the fluid chamber opposite to the impeller in an axial direction. The turbine mainly includes an annular turbine shell, a plurality of turbine blades fixed on the surface of the turbine shell facing towards the impeller, and an annular turbine core fixed inside of the turbine blades. The inner periphery portion of the turbine shell is fixed to the flange of a turbine hub by a plurality of rivets. The turbine hub is coupled with an input shaft and is unrotatable. The stator is a mechanism to regulate flow of the operating oil returning to the impeller from the turbine and is disposed between the inner periphery portion of the impeller and the inner periphery portion of the turbine. The stator mainly includes an annular stator shell, a plurality of stator blades provided on the outer surface of the annular stator shell, and an annular stator core fixed at the end of the plurality of stator blades. The annular stator shell is supported by a fixing shaft via a one-way clutch.

Generally, the torque converter enables smooth acceleration and deceleration by transmitting power via fluid. However, the slippage of fluid causes energy loss and low fuel efficiency.

Accordingly, some torque converters have included a lock-up device disposed in a space between the front cover and the turbine that mechanically couples the front cover on the input side and the turbine on the output side. The lock-up device mainly includes a disc-like piston which can be pressed against the front cover, a driven plate attached to the back surface side of the turbine, and a torsion spring elastically coupling the piston and the driven plate in a rotational direction. The piston has an annular friction member adhered to a position opposed to a flat friction surface of the front cover, as shown in Japanese Unexamined Patent Publication No. 2004-100714

On the other hand, a multi-staged transmission reduces the need for the function to increase torque ratio provided in the torque converter. That is to say, even if a usual friction clutch without the function to increase torque ratio is used instead of the torque converter, the multi-staged transmission allows the vehicle to secure smooth start performance.

In such a case, the friction clutch for starting is provided in an automatic transmission instead of the torque converter. However, since the known torque converter is controlled by the hydraulic circuit with two oil passages, a friction clutch is also required to be controllable through only two oil passages in order to be attached.

SUMMARY OF THE INVENTION

It is an object of the present invention to provide a friction clutch that is installable instead of a known torque converter.

According to a first aspect of the present invention, a clutch device is a device that transmits torque from an engine of a vehicle to a transmission and includes a clutch engaging portion, a piston, a first oil passage, a second oil passage, and an operating oil supply unit. The clutch engaging portion includes a plurality of plate members. The piston is disposed close to the clutch engaging portion. The first oil passage has one end on the piston side and the second oil passage has one end on the clutch engaging portion side. The operating oil supply unit switches clutch engaged states, whereby the clutch is engaged as an operating oil is supplied to the first oil passage from the outside while the operating oil in the second oil passage is drained to the outside, and the clutch is disengaged as the operating oil in the first oil passage is drained to the outside while the operating oil is supplied to the second oil passage from the outside.

With this clutch device, the clutch is engaged as the piston pushes the clutch engaging portion upon provision of the operation oil into the first passage and drain of the same from the second passage by the operating oil supply unit. On the other hand the clutch is disengaged as the piston departs from the clutch engaging portion upon provision of the operating oil to the second passage and drain of the same from the first passage by the operating oil supply unit, wherein the plate members depart from each other also.

A clutch device according to a second aspect of the present invention is the device of the first aspect, wherein a hole penetrating the piston side and the clutch engaging portion side is formed in the piston. The clutch engaging portion has a space that connects to the hole and the second oil passage in the clutch disengaged state and disconnects the hole and the second oil passage in the clutch engaged state.

With this clutch device, the operating oil flows through the hole from the second oil passage to the first oil passage in the clutch disengaged state to cool the clutch engaging portion. The operating oil does not flow through the hole from the first oil passage to the second oil passage when the clutch is in an engaged state.

A clutch device according to a third aspect of the present invention is the device of the second aspect, further including a housing member containing the clutch engaging portion and the piston. The space is formed by the piston, the plurality of plate members, and the housing member.

A clutch device according to a fourth aspect of the present invention is the device of the third aspect, wherein the space is secured radially outward of the clutch engaging portion.

A clutch device according to a fifth aspect of the present invention is the device of the second aspect, further including a bypass oil passage connecting the first oil passage and the second oil passage and provided in parallel with the hole and the space.

With this clutch device, the operating oil flows through the bypass oil passage from the first oil passage to the second oil passage in the clutch engaged state so that the heat generated after engaging the clutch is cooled quickly.

A clutch device according to a sixth aspect of the present invention is the device of any of the first to fifth aspects, further including an oil guide member that secures the first oil passage between the housing member the oil guide member.

With this clutch device, the use of the oil guide member to secure the first oil passage makes the process easy.

A clutch device according to a seventh aspect of the present invention is the device of any of the first to fifth aspects, further including an oil guide member securing the first oil passage between the housing member the oil guide member. A bypass oil passage connecting the first oil passage and the second oil passage provided in parallel with the hole and the space is formed with the oil guide member.

With this clutch device, the operating oil flows through the bypass oil passage from the first oil passage to the second oil passage in the clutch engaged state.

EFFECT OF THE INVENTION

With the clutch device according to the present invention, the friction clutch which is installable instead of the known torque converter is provided.

BRIEF DESCRIPTION OF THE DRAWINGS

The FIGURE is a view of a schematic cross-sectional diagram of a clutch device according to the present invention.

EXPLANATIONS OF LETTERS OR NUMERALS

1 wet type multiple clutch (clutch device)
3 front cover (housing member)
4 housing plate (housing member)
5 fluid chamber
6 clutch engaging portion
7 damper mechanism
8 oil guide member
11 first oil passage
12 second oil passage
20 piston

DETAILED DESCRIPTION OF THE PREFERRED EMBODIMENT

The FIGURE shows a schematic cross-sectional diagram of a wet type multiple disc clutch 1 according to a preferred embodiment of the present invention. The wet type multiple disc clutch 1 is a clutch used to start instead of a known torque converter. The wet type multiple disc clutch 1 is disposed at the same position as the known torque converter. Consequently an engine (not shown) is disposed on the left side of the FIGURE and a transmission (not shown) is disposed on the right side of the FIGURE.

The wet type multiple disc clutch 1 is a device that transmits torque to an input shaft 2 of the transmission and mainly includes a front cover 3 forming a fluid chamber, a housing plate 4, a clutch unit 6, and a damper mechanism 7.

The front cover 3 is a disc-like member disposed on the engine side in an axial direction wherein a cylindrical boss 13 is fixed to the inner periphery portion and nuts 14 are fixed to the outer periphery portion of the front cover 3. An outer periphery portion of a plate member (not shown) fixed to the crankshaft is fixed to the nut 14 by bolts (not shown). A first outer cylindrical portion 15 extending towards the transmission in the axial direction and a second outer cylindrical portion 16 further extending therefrom towards the transmission in the axial direction are provided at the outer periphery of the front cover 3. The second outer cylindrical portion 16 is disposed radially outward of the first outer cylindrical portion 15 and extends further in the axial direction compared to the first outer cylindrical portion 15. Although the inner surface of the first outer cylindrical portion 15 is circular, the second inner cylindrical portion 16 repeatedly forms radial concavity and convexity and has a plurality of inner teeth 16a facing radially inwardly.

The housing plate 4 is an approximately disc-like member and the outer periphery thereof is fixed by welding to the outer periphery of the front cover 3, that is, the end of the second outer cylindrical portion 16. The housing plate 4 has a flat outer periphery portion 17 disposed at the outer periphery portion. The outer periphery portion 17 has a flat surface facing towards the engine side in the axial direction (a perpendicular plane to the center of the axial direction). An inner cylindrical portion 26 extending towards the transmission side in the axial direction is provided at the inner periphery of the housing plate 4. The inner cylindrical portion 26 is disposed radially outward of the input shaft 2 and forms a second port 27 between the input shaft 2 and itself.

A fluid chamber 5 is formed by the front cover 3 described above and the housing member including the housing plate 4. The fluid chamber 5 cases a clutch unit 6, a damper mechanism 7, and an oil guide member 8 and serves as an input member for the clutch unit 6 and the damper mechanism 7.

The clutch unit 6 is a device that transmits and interrupts torque from the front cover 3 and the housing plate 4 to the damper mechanism 7. The clutch unit 6 is disposed at the most outer periphery portion in the fluid chamber 5, that is, radially inward of the first and second outer cylindrical portions 15 and 16. The clutch unit 6 includes the plurality of drive plates 18, a plurality of driven plates 19, and a piston 20.

The drive plates 18 are four plates lining in the axial direction, and the plate nearest to the transmission is disposed to be frictionally engagable and unengagable with the outer periphery portion 17 of the housing plate 4. The outer periphery portion of the drive plates 18 engages to be axially movable and unrotatable relative to the inner teeth 16a of the second outer cylindrical portion 16 of the front cover 3. In other words, at the outer periphery of the drive plates 18, radial concavity and convexity are formed as outer teeth.

The driven plates 19 are three plates lining in the axial direction and are disposed between the drive plates 18. The driven plates 19 have friction facings adhered on both sides of a core plate. The inner periphery portion of the driven plates 19 engage to be axially movable and unrotatable relative to a engagement member 31 (described later) of the damper mechanism 7.

The oil guide member 8 is a member that forms the first oil passage or the oil chamber 11 in the fluid chamber 5. The oil guide member 8 is a disc-like member disposed close to the front cover 3. The oil guide member 8 includes a disc-like portion 8a, an outer cylindrical portion 8b axially extending towards the transmission side, and an inner cylindrical portion 8c axially extending towards the transmission side. The disc-like portion 8a is fixed to the front cover 3 by spot welding 23 so that the oil guide member 8 integrally rotates with the front cover 3. An axially penetrating bypass passages 8d are formed in the disc-like portion 8a. The plurality of bypass passages 8d is formed at a plurality of points disposed in the circumferential direction in the outer periphery portion.

The piston 20 is a member that engages the clutch by applying an urging force to the clutch unit 6. The piston 20 is an annular member disposed on the axial engine side of the clutch unit 6 and between the first outer cylindrical portion 15 and the second outer cylindrical portion in the radial direction. The piston 20 has an annular pressing portion 20a at the position corresponding to the clutch unit 6. The pressing portion 20a is adjacent to the drive plates 18 disposed on the nearest side to the engine in the axial direction. The outer surface of the piston 20 is supported by the inner surface of the first outer cylindrical portion 15 via a seal member 21. In addition, the inner periphery surface of the piston 20 is supported by the outer periphery surface of the outer cylindrical portion 8b of the oil guide member 8 via a seal member 22. As a result, the piston 20 is axially movable and rotatable relative to the front cover 3 and the oil guide member 8. The seal members 21 and 22 are annular members disposed in grooves formed in the piston 20.

The damper mechanism 7 is a mechanism that transmits torque from the clutch unit 6 to the input shaft 2 and absorbs and damps the torsional vibration. The damper mechanism 7 includes first and second plates 32 and 33 on the input side, a plurality of torsion springs 36, and hub flanges 37, and a hub 38 on the output side.

The first and second plates 32 and 33 are disposed to be axially spaced and are fixed together. The first plate 32 is disposed on the engine side in the axial direction, and the second plate 33 is disposed on the transmission side in the axial direction. An engaging member 31 is fixed to the outer periphery portion of the second plate 33 by rivets 35. The engaging member 31 has an annular portion 31a and a plurality of projections 31b axially extending towards the engine. The projections 31b are disposed at the same radial position as the outer cylindrical portion 8b of the oil guide member 8, and their ends are close, with a clearance 34 in between. A plurality of inner teeth formed at the inner periphery end of the driven plates 19 is inserted between the projections 31b. This engagement allows the driven plates 19 to be axially movable and unrotatable relative to the engaging member 31.

The hub flange 37 is disposed between the first and second plates 32 and 33 in the axial direction. The torsion spring 36 elastically couples the plates 32 and 33 with the hub flange 37 in the rotational direction.

The hub 38 is disposed radially inward of the plates 32 and 33 and the hub flange 37. The hub 38 has an axially extending cylindrical portion 38a. The inner periphery surface of the inner cylindrical portion 8c of the oil guide member 8 is supported to be relatively rotatable and axially movable on the outer periphery surface of a portion axially extending towards the engine, of the cylindrical portion 38a. A groove is formed on the outer periphery surface of the cylindrical portion 38a, and a seal member 40 is disposed therein. The seal member 40 contacts with the inner periphery surface of the inner cylindrical portion 8c of the oil guide member 8. The hub 38 has spline teeth 38b engaging with a spline 2a formed on the outer periphery surface of the input shaft 2. Furthermore, a seal member 41 is disposed between the inner periphery surface of the end of the cylindrical portion 38a and the outer periphery surface of the input shaft 2. The hub 38 and the hub flange 37 are relatively rotatable via a torsion spring (not shown) having a low rigidity within the predetermined angle. The both may engage to be relatively unrotatable or may be formed integrally.

A space in the fluid chamber 5 will be described. A first oil passage 11 is formed between the front cover 3 and the oil guide member 8. The radially inward portion of the first oil passage 11 connects with a first port 2b which is an oil passage in the input shaft 2. Since axially penetrating holes 20b are formed in the piston 20, the outer periphery portion of the first oil passage 11 connects a space (described later) closer to the transmission in the axially direction than the piston 20.

An axially penetrating hole 25 is formed in the outer periphery portion of the drive plates 18 so that a space 28 filled with the operating oil is formed in the outer periphery portion of the clutch unit 6. The space 28 always connects to the first oil passage 11 through the hole 20b of the piston 20.

It is assumed that the space inside the clutch unit 6 is the second oil passage or the oil chamber 12. In the clutch disengaged state, the first oil passage 11 and the second oil passage 12 connect via the hole 20b of the piston 20 and the space 28, and further connect through the hole 20b and clearance 34. In the clutch engaged state, however, these passages are disconnected. In the clutch engaged state, the first oil passage 11 and the second oil passage 12 connect through only a bypass oil passage 8d.

The first port 2b and the second port 27 are connected to the operating oil supply unit 43. The operating oil supply unit 43 includes a pump, a tank, and a control unit. The operating oil supply unit 43 can switch a clutch engaging operation whereby the operating oil is supplied to the first port 2b while the operating oil is drained from the second port 27, and a clutch releasing operation whereby the operating oil is drained from the second port 27 while the operating oil is supplied to the first port 2b.

(2) Operation

The operating oil flows toward the outward radius as the operating oil is supplied to the first port 2b via the first oil passage 1. The operating oil flows from the hole 20b of the piston 20 to the space 28, and then flows further to the second oil passage 12. The piston 20 moves towards the plates 18 and 19, and makes the plates 18 and 19 contact each together. In this clutch engaged state, the space 28 is disconnected from the second oil passage. As a result, the operating oil in the first oil passage 11 flows to the second oil passage 12 only by passing through the bypass passage 8d, thereby enabling a speedy cooling of the heat generated by the clutch engagement. The operating oil in the oil passage 12 is drained from the second port 27 to the operating oil supply unit 43.

Once the operating oil is supplied to the second port 27, the operating oil flows to the second oil passage 12, and the operating oil in the first oil passage 11 is drained. As a result, the piston 20 moves in the direction so that it departs from the plates 18 and 19. The operating oil in the second oil passage 12 flows into the space 28 via the clearance between the plates 18 and 19, and further flows from the hole 20b of the piston 20 into the first oil passage 11. Since the operating oil passes near the plates 18 and 19, the clutch unit 6 is lubricated and cooled.

The clutch device 1 is disposed at the same position as the known torque converter. The clutch device 1 is downsized compared to the known torque converter, specifically, axial and radial sizes of the clutch device 1 are shorter. In addition, the clutch device 1 is lighter than the known torque converter.

By using the clutch device 1, the drag torque in the torque converter can be resolved. That is to say, since power is interrupted concurrently with the slowdown, the improvement of the fuel efficiency can be achieved.

The above embodiment is used for explaining the present invention and does not limit the present invention. The various modifications and revisions are possible without departing the gist of the invention.

INDUSTRIAL APPLICABILITY

Since the clutch device according to the present invention is a friction clutch that can be disposed instead of the known torque converter, it is useful in the field that has needs for torque transmitting devices driven by the hydraulic pressure.

What is claimed is:

1. A clutch device for transmitting torque from an engine of a vehicle to a transmission, comprising:
   a clutch engaging portion including a plurality of plate members;
   a piston being disposed close to the clutch engaging portion, the piston having a hole penetrating from a first axial side of the piston to a second axial side opposite the first axial side facing the clutch engaging portion;
   a first oil passage having one end on a piston side;

a second oil passage having one end on a clutch engaging portion side; and an operating oil supply unit configured to select clutch engaging states by switching between supplying operating oil from the first oil passage while draining from the second oil passage, and supplying the operating oil from the second oil passage while draining from the first oil passage, the clutch engaging portion being engaged as the operating oil is supplied to the first oil passage from the outside of the clutch device while the operating oil in the second oil passage is drained to the outside of the clutch device, the clutch engaging portion being disengaged as the operating oil in the first oil passage is drained to the outside of the clutch device while the operating oil is supplied to the second oil passage from the outside of the clutch device, the first oil passage communicating with the second oil passage through the clutch engaging portion when the clutch engaging portion is disengaged, and the operating oil being prevented from flowing between an upper side of the clutch engaging portion to a lower side of the clutch engaging portion when the clutch engaging portion is engaged.

2. The clutch device according to claim 1, wherein the clutch engaging portion has a space connecting and disconnecting the hole and the second oil passage in a clutch disengaged state and a clutch engaged state.

3. The clutch device according to claim 2, further comprising
a housing member containing the clutch engaging portion and the piston, wherein the space is formed by the piston, the plurality of plate members, and the housing member.

4. The clutch device according to claim 3, wherein the space is secured radially outward of the clutch engaging portion.

5. The clutch device according to claim 3, further comprising a bypass oil passage provided in parallel with the hole and the space configured to connect the first oil passage and the second oil passage.

6. The clutch device according to claim 1, further comprising
a housing member, and
an oil guide member being configured to secure the first oil passage between the housing member and the oil guide member.

7. A clutch device for transmitting torque from an engine of a vehicle to a transmission, comprising:
a housing member;
a clutch engaging portion including a plurality of plate members;
a piston being disposed close to the clutch engaging portion;
a first oil passage having one end on a piston side;
a second oil passage having one end on a clutch engaging portion side;
an operating oil supply unit configured to select clutch engaging states by switching between supplying operating oil from the first oil passage while draining from the second oil passage, and supplying from the second oil passage while draining from the first passage,
the clutch engaging portion being engaged as the operating oil is supplied to the first oil passage from the outside of the clutch device while the operating oil in the second oil passage is drained to the outside of the clutch device, and the clutch engaging portion being disengaged as the operating oil in the first oil passage is drained to the outside of the clutch device while the operating oil is supplied to the second oil passage from the outside of the clutch device;

an oil guide member being configured to secure the first oil passage between the housing member and the oil guide member; and a bypass oil passage provided in parallel with the hole and a space being configured to connect the first oil passage and the second oil passage, the space being formed with the oil guide member, the operating oil being prevented from flowing between an upper side of the clutch engaging portion to a lower side of the clutch engaging portion when the clutch engaging portion is engaged.

8. The clutch device according to claim 2, further comprising
a housing member, and
an oil guide member being configured to secure the first oil passage between the housing member and the oil guide member.

9. The clutch device according to claim 3, further comprising an oil guide member being configured to secure the first oil passage between the housing member and the oil guide member.

10. The clutch device according to claim 4, further comprising an oil guide member being configured to secure the first oil passage between the housing member and the oil guide member.

11. The clutch device according to claim 5, further comprising an oil guide member being configured to secure the first oil passage between the housing member and the oil guide member.

12. The clutch device according to claim 2, further comprising
a housing member, and
an oil guide member being configured to secure the first oil passage between the housing member and the oil guide member, wherein
a bypass oil passage is provided in parallel with the hole and the space being configured to connect the first oil passage and the second oil passage, and
the space is formed with the oil guide member.

13. The clutch device according to claim 3, further comprising an oil guide member being configured to secure the first oil passage between the housing member and the oil guide member, wherein
a bypass oil passage is provided in parallel with the hole and the space being configured to connect the first oil passage and the second oil passage, and
the space is formed with the oil guide member.

14. The clutch device according to claim 4, further comprising an oil guide member being configured to secure the first oil passage between the housing member and the oil guide member, wherein
a bypass oil passage is provided in parallel with the hole and the space being configured to connect the first oil passage and the second oil passage and
the space is formed with the oil guide member.

15. The clutch device according to claim 5, further comprising an oil guide member being configured to secure the first oil passage between the housing member and the oil guide member, wherein a bypass oil passage is provided in parallel with the hole and the space being configured to connect the first oil passage and the second oil passage, and the space is formed with the oil guide member.

16. The clutch device according to claim 1, further comprising a housing member, and an oil guide member being configured to secure the first oil passage between the housing member and the oil guide member, the oil guide member having a bypass oil passage connecting the first oil passage and the second oil passage formed in the oil guide member, and the space is formed with the oil guide member.

17. The clutch device according to claim 1, further comprising a front cover, and a oil guide member that faces the front cover to form the first oil passage between the front cover and the oil guide member, the oil guide member has an outer periphery surface that supports the piston.

18. The clutch device according to claim 17, further comprising an engagement member that engages with an inner periphery of the clutch engaging portion, the engagement member has at least one projection that extends axially toward the oil guide member, wherein the oil guide member has an outer cylindrical portion that extends toward the at least one projection to form a clearance with the at least one projection, the clearance connects the first oil passage with second oil passage.

19. The clutch device according to claim 18, further comprising a damper mechanism that includes the engagement member.

20. The clutch device according to claim 19, further comprising a transmission input shaft that is connected to the damper mechanism.

* * * * *